No. 615,507. Patented Dec. 6, 1898.
G. E. SOVEREIGN.
SHAFT BEARING.
(Application filed May 24, 1898.)
(No Model.)

WITNESSES:
A. R. Krousse
Russell M. Everett

INVENTOR:
George E. Sovereign,
BY Draket
ATTORNEYS.

UNITED STATES PATENT OFFICE.

GEORGE E. SOVEREIGN, OF POTTERSVILLE, NEW JERSEY.

SHAFT-BEARING.

SPECIFICATION forming part of Letters Patent No. 615,507, dated December 6, 1898.

Application filed May 24, 1898. Serial No. 681,601. (No model.)

*To all whom it may concern:*

Be it known that I, GEORGE E. SOVEREIGN, a citizen of the United States, residing at Pottersville, in the county of Hunterdon and State of New Jersey, have invented certain new and useful Improvements in Shaft-Bearings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide an adjustable shaft-hanger which affords bearings for the shaft at a plurality of independent points, to provide an adjustable bearing which shall be more rigid than those heretofore in use, and to provide an adjustable bearing having the outermost point of rigidity at the end of the journal-box instead of at its middle, to thereby enable a longer shaft-bearing to be had in the same space, to enable the power transmitted through the shaft to be exerted close to the outermost point of rigidity, and to secure other advantages and results, some of which may be referred to hereinafter in connection with the description of the working parts.

The invention consists in the improved shaft-bearing and in the arrangements and combinations of parts of the same, all as will be hereinafter set forth, and finally embraced in the clauses of the claim.

Figure 1:
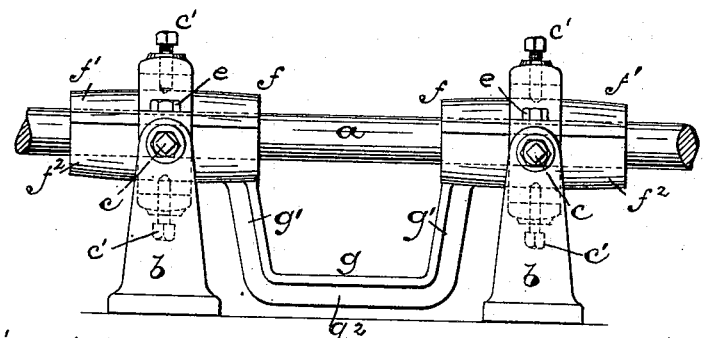
Figure 2:
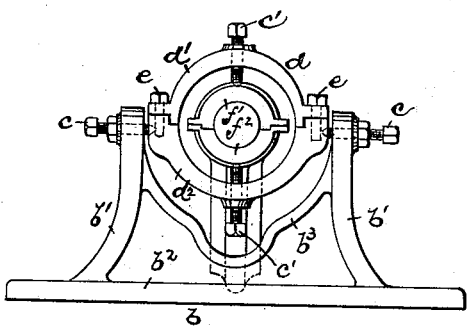
Figures 3, 4:
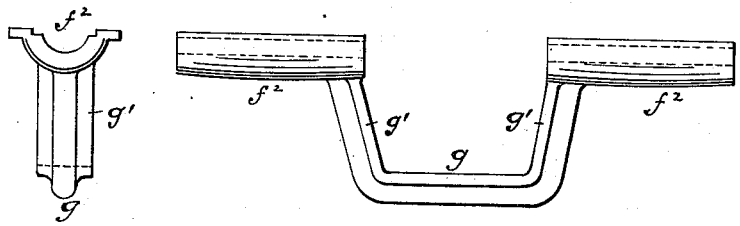

Referring to the accompanying drawings, in which like letters of reference indicate corresponding parts in each of the several views, Figure 1 is a side view of my improved shaft-bearing in position. Fig. 2 is an end view of the same. Fig. 3 is a detail end view of the lower member of the journal-boxes; and Fig. 4 is a side view of the same, showing the arch connecting said boxes.

In said drawings, $a$ indicates the shaft, and $b$ the hanger-frames, which may be of any ordinary construction adapted to be secured to the floor, ceiling, or wall in any usual manner. Said brackets each have arms $b'$ $b'$ projecting from the base $b^2$ and strengthened by the connecting-brace $b^8$. At their ends said arms $b'$ are perforated and interiorly threaded to provide bearings for supporting-screws $c$, which project inwardly toward each other from the opposite sides and support the ring $d$. The rings $d$ are thus pivotally supported and are free to oscillate upon a horizontal axis. Said rings preferably each comprise upper and lower sections $d'$ $d^2$, which are provided with flanges adapted to fit together and receive screw-bolts $e$, by which the said sections are firmly fastened together to form the ring. Said ring $d$ has, further, at points distant about one-quarter of the circumference from its pivotal points supporting-screws $c'$, projecting radially inward therethrough toward the center in a manner similar to the supporting-screws $c$ in the arms $b'$ of the hanger-frame. The inner ends of these supporting-screws $c'$ enter sockets at opposite sides of the journal-box $f$ and pivotally support the same out of contact with the ring $d$, so that it may turn on a vertical axis independent of said ring. Said box $f$ is of sufficient length to give a stable support to the shaft and is formed of upper and lower members or halves, (marked $f'$ and $f^2$, respectively.) At their meeting edges said members $f'$ and $f^2$ are flanged and suitably grooved and tongued to engage each other, and the supporting-screws $c'$ $c'$ bear against the middle points of the peripheries of said members and serve to hold them together in position.

In my improved bearing I provide two such journal-boxes, as above described, at separate points on the shaft, said shaft resting in said boxes, and between the boxes the shaft being free to receive a pulley, fly-wheel, or the like. The adjacent ends of the boxes I then connect by an arch $g$, which may extend between either the upper or the lower members of the boxes. Said arch is preferably made integral with the members, and its arms $g'$ $g'$ preferably extend outward substantially perpendicular to the shaft. The length of the arms is determined by the diameter of the clear space which is wanted around the shaft between the boxes, and the central portion $g^2$ of the arch lies substantially parallel to the shaft. It will be evident that by this construction either end of the shaft may be adjusted in any direction at right angles to the length of the shaft, as has been common heretofore.

Furthermore, by having the arch $g$ connecting the two boxes $f$ they become practically one rigid bearing, with the outermost points of resistance to movement of the shaft at right angles to its length at the extreme outer ends of the boxes.

In the constructions heretofore in use the boxes have been entirely independent of each other, which caused the outermost points of rigidity to be at the pivotal points of said boxes—that is, at their middle points. Outside of the middle of each box there was no resistance to movement of the shaft in directions at right angles to its length, as will be understood.

The two boxes gave a bearing equal in length to the distance between the points of support of said boxes or their middles. Hence it will be seen that my improved device produces the same effect as placing the hangers in the old construction farther apart by a distance equal to the length of one of the boxes. Not only is obtained a greater length of bearing in the same space, but my device further enables the power transmitted by the shaft to be exerted close to the outermost point of rigidity. For example, a grinding-disk can be keyed on the shaft close to the end of the box $f$, where it will be held rigidly, with no chance for vibration. Without the arch when the outermost point of rigidity lies at the middle of the box, as has been described, it is obviously unavoidable to have a space between said outermost point of rigidity and the grinding-plate equal to one-half the length of the box. This obstacle to firmness and solidity of the grinding-disk while running is entirely remedied by the improved construction herein shown, by which it is possible to place the grinding-disk closely contiguous to the outermost point of rigidity.

Having thus described my invention, what I claim as new is—

In a shaft-bearing, the combination of collars $d, d$, each independently pivoted upon diametrically-opposite screws $c, c$, whereby the collar is adjustable in opposite directions, boxes $f, f$, similarly pivoted in said collars upon screws $c', c'$, and adjustable in a line at right angles to the line in which said collars are adjustable, means for supporting said parts, and an arch $g$, connecting the adjacent ends of said adjustable boxes $f, f$, and being freely movable therewith independently of the said supporting means, substantially as set forth.

In testimony that I claim the foregoing I have hereunto set my hand this 21st day of January, 1898.

GEORGE E. SOVEREIGN.

Witnesses:
 CHARLES H. PELL,
 C. B. PITNEY.